B. SLUSSER.
Excavator.

No. 237,330. Patented Feb. 1, 1881.

WITNESSES:
W. W. Hollingsworth
Amos W. Hart

INVENTOR:
Benj. Slusser
BY
ATTORNEYS.

UNITED STATES PATENT OFFICE.

BENJAMIN SLUSSER, OF SIDNEY, OHIO.

EXCAVATOR.

SPECIFICATION forming part of Letters Patent No. 237,330, dated February 1, 1881.

Application filed January 28, 1880.

*To all whom it may concern:*

Be it known that I, BENJAMIN SLUSSER, of Sidney, in the county of Shelby and State of Ohio, have invented a new and Improved Self-Loading Excavator; and I do hereby declare that the following is a full, clear, and exact description of the same.

My invention relates to several improvements upon the self-loading excavator or ditcher for which I have received Letters Patent of the United States No. 72,098, dated December 10, 1867.

The nature of said improvements is hereinafter fully set forth, and the construction and arrangement of the mechanical parts are illustrated in accompanying drawings, forming part of this specification, in which—

Figure 1:
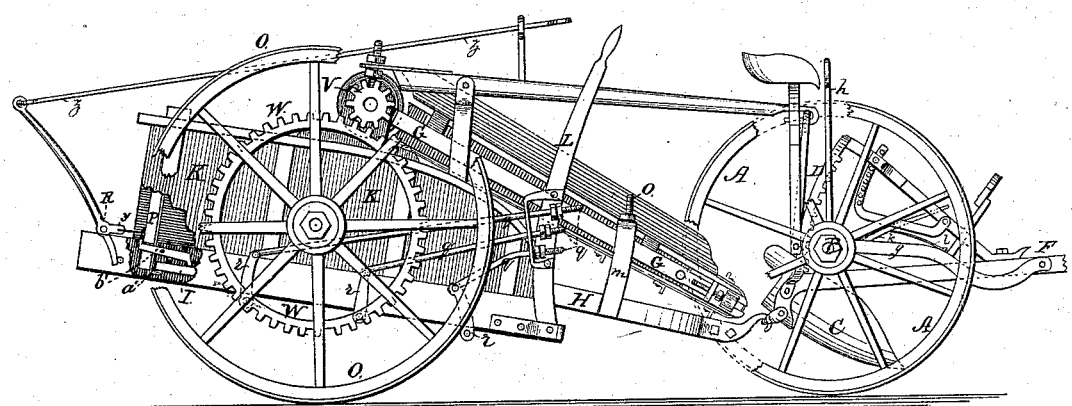
Figure 2:
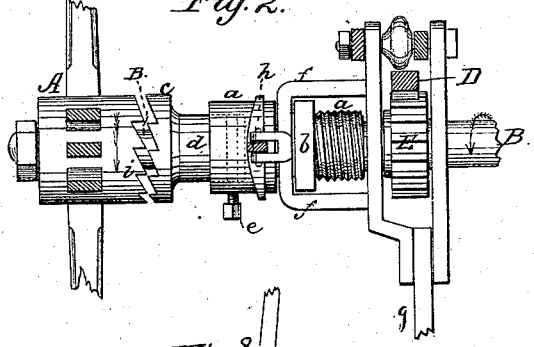
Figure 3:
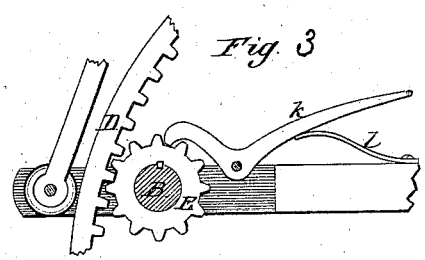
Figure 4:
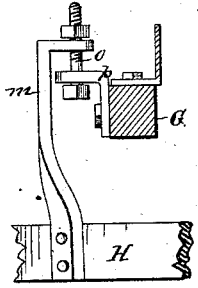
Figure 5:
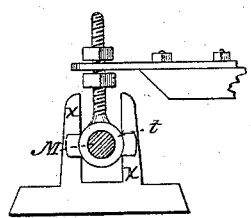

Figure 1 is mainly a side view of the machine, certain parts being in section or broken away. Figs. 2 to 6, inclusive, are detail views, Figs. 4 and 6 more especially representing the parts which embody my invention.

For better understanding of the following specific description of my improvements reference may be had to my aforesaid patent.

The forward wheel, B, may be locked with its axle B by means of a clutch, so that rotation of the axle will raise the plow C through the operation of racks D and pinions E. The clutch consists of a threaded sleeve, $a$, working in nut $b$, and receiving in its outer end the part $d$ of half-clutch $c$, which is shifted by lever $h$ to bring it in engagement with half-clutch $i$ fixed on wheel-hub. A set-screw, $e$, passes through sleeve $a$ and enters a groove in part $d$. The nut $b$ is held from turning in a guard, $f$, attached to hounds $g$. The clutch is automatically disengaged by the nut $b$ coming in contact with the outer end of the fixed guard $f$. The foot-pawl $k$ engages pinion E and holds it locked, so that the plow C may be held elevated at any required height.

My first improvement consists in the means for adjusting the lower end of the traveling apron-frame G, so that the apron may be made to co-operate with the plow C in the desired manner. Said means consist (see Figs. 1 and 4) of angular arms or brackets $m$, that are rigidly attached to the coupling-bar H, and have screws $o$ passing through their upper ends, and through ears $p$ attached to the apron-frame G. By turning the screws $o$ the latter will be raised or lowered, as required.

The floor-sections I of the cart-body K have crank-arms $r$, connected by rods $q$, whose front ends pass through a slot in hand-lever L, whereby all of said floor-sections may be adjusted simultaneously. The nuts $s$ on the ends of the rods enable the latter to be adjusted as required, to cause the sections I to shut with exactitude.

The apron-shaft M has adjustable boxes or hangers $t$, that slide vertically in brackets $x$. Pinions on said shaft engage gears W fixed on cart-wheels O, and by adjusting the hangers the wear of the pinions and gears is compensated for, and also any distortion of the frame of the machine.

Figure 6:
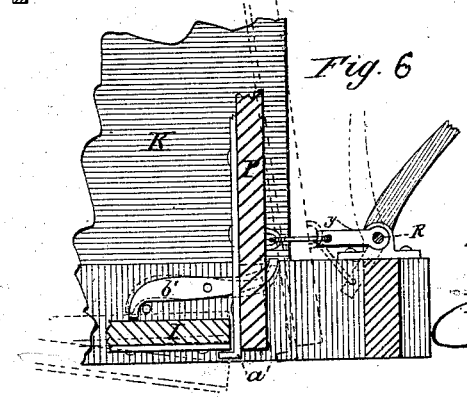
Figure 7:
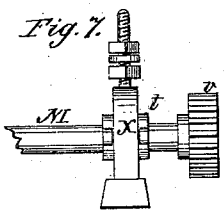

The last feature of improvement relates to the means for operating the end gate, P, of the cart, Figs. 1 and 6.

The shaft R in rear of the gate has lugs or short arms, $y$, that are connected with the gate, and when the rod $z$ is pulled said shaft is rotated a quarter-turn, thus drawing the lower edge of the gate backward and releasing the catches $a'$ on its inner side from engagement with the rear floor-section, I, so that it drops and allows all the other sections to do the same in succession.

Figure 8:
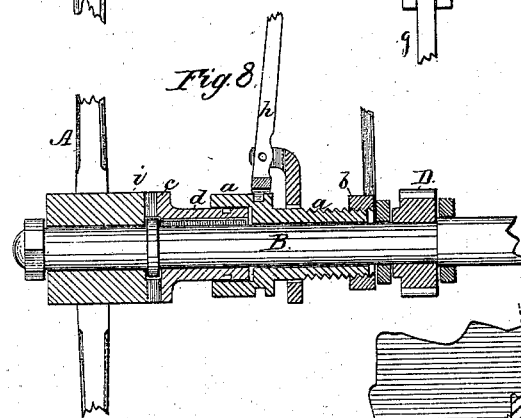

A trigger or catch, $b'$, is pivoted to the side of the cart-body at a point contiguous to the lower edge of the end-gate P, and the latter is slotted or notched to allow it to pass over the outer end of the trigger. The inner end of the trigger is weighted and rests normally on a stud, as shown in full lines, Fig. 8, in which position its upwardly-curved outer end engages the edge of the end-gate when closed. When the end-gate is drawn back to allow the trap I to fall it will slide over and depress the rear end of the catch $b'$; but the latter will at once assume its former position, in which case the end-gate will rest against the rear end of the catch and be prevented from closing or swinging back to the vertical position, as shown in dotted lines, Fig. 6. In other words, the end-gate P will be held open by the catch $b'$ until the traps or floor-sections I are again raised, the last one of which, swinging up, as shown in dotted lines, Fig. 6, will raise the weighted inner end of the trigger $b'$, and correspondingly depress its outer end, so that the end-gate may close, as before.

What I claim is—

1. In an excavator or ditcher, the combination, with the traveling apron-frame and the frame which couples the front and rear axles, of the rigid bracket or angular arm, the set-screws, and ears attached to the apron-frame, as shown and described.

2. In an excavator or ditcher, the combination, with the rear hinged floor-section, of the end-gate, the rock-shaft connected with the latter, and the pivoted weighted trigger, as shown and described.

BENJAMIN SLUSSER.

Witnesses:
THOS. J. PETIT,
J. VERNON LEWIS.